US011855458B2

(12) United States Patent
Christensen et al.

(10) Patent No.: US 11,855,458 B2
(45) Date of Patent: Dec. 26, 2023

(54) CURRENT INJECTION IN WIND POWER PLANTS

(71) Applicant: VESTAS WIND SYSTEMS A/S, Aarhus N (DK)

(72) Inventors: Leif Svinth Christensen, Thorsø (DK); Brian W. Andersen, Ringkøbing (DK); Federico Rueda Londono, Aarhus C (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 16/957,080

(22) PCT Filed: Nov. 20, 2018

(86) PCT No.: PCT/DK2018/050305
§ 371 (c)(1),
(2) Date: Jun. 22, 2020

(87) PCT Pub. No.: WO2019/120400
PCT Pub. Date: Jun. 27, 2019

(65) Prior Publication Data
US 2020/0350765 A1 Nov. 5, 2020

(30) Foreign Application Priority Data
Dec. 21, 2017 (DK) .......................... PA 2017 70971

(51) Int. Cl.
*H02J 3/16* (2006.01)
*H02J 13/00* (2006.01)
(Continued)

(52) U.S. Cl.
CPC .............. *H02J 3/16* (2013.01); *F03D 7/0284* (2013.01); *H02J 3/001* (2020.01); *H02J 3/381* (2013.01);
(Continued)

(58) Field of Classification Search
CPC ........ H02J 3/16; H02J 13/00006; H02J 3/001; H02J 13/00002; H02J 3/381;
(Continued)

(56) References Cited

U.S. PATENT DOCUMENTS

2010/0094474 A1 4/2010 Larsen et al.
2010/0332040 A1* 12/2010 Garcia ................... F03D 7/048
700/287

(Continued)

FOREIGN PATENT DOCUMENTS

CN 101882798 A 11/2010
CN 101929439 A 12/2010
(Continued)

OTHER PUBLICATIONS

Danish Patent and Trademark Office First Technical Examination for Application PA 2017 70971 dated Jun. 13, 2018.
(Continued)

*Primary Examiner* — Rexford N Barnie
*Assistant Examiner* — Thai H Tran
(74) *Attorney, Agent, or Firm* — Patterson + Sheridan, LLP (57) ABSTRACT

A method for controlling a renewable energy generator, the renewable energy generator being connected to a Point of Interconnection of an external power grid by a connecting network, wherein the connecting network has an associated impedance level. The method comprising: monitoring at least one parameter of the connecting network and the voltage level at the Point of Interconnection; generating, during normal operating conditions, at least one current injection profile based upon the at least one measured parameter and a predetermined injection profile; and operating the renewable energy generator, during a grid fault, to output current according to the at least one current injection (Continued)

profile, so as to achieve a current set point at the Point of Interconnection.

18 Claims, 7 Drawing Sheets

(51) Int. Cl.
*H02J 3/00* (2006.01)
*F03D 7/02* (2006.01)
*H02J 3/38* (2006.01)
*H02J 3/50* (2006.01)

(52) U.S. Cl.
CPC .. *H02J 13/00002* (2020.01); *H02J 13/00006* (2020.01); *F05B 2270/337* (2013.01); *H02J 3/50* (2013.01); *H02J 2300/28* (2020.01)

(58) Field of Classification Search
CPC ..... H02J 2300/28; H02J 3/386; F03D 7/0284; F05B 2270/337; F05B 2270/10711; Y02B 90/20; Y04S 40/12; Y02E 10/72; Y02E 40/30; Y02E 10/76
See application file for complete search history.

(56) References Cited

U.S. PATENT DOCUMENTS

| | | |
|---|---|---|
| 2012/0061964 A1 | 3/2012 | Kirchner |
| 2013/0015660 A1* | 1/2013 | Hesselbæk ............... H02J 3/50 290/44 |
| 2014/0244058 A1* | 8/2014 | Zweigle ............ H02J 13/00034 700/291 |
| 2015/0137520 A1* | 5/2015 | Garcia ................. F03D 7/0284 290/44 |
| 2016/0268940 A1 | 9/2016 | Achilles et al. |
| 2016/0322821 A1 | 11/2016 | Saboor et al. |

FOREIGN PATENT DOCUMENTS

| | | |
|---|---|---|
| CN | 102709952 A | 10/2012 |
| CN | 104396113 A | 3/2015 |
| CN | 106712088 A | 5/2017 |
| CN | 106786560 A | 5/2017 |
| CN | 107359617 A | 11/2017 |
| EP | 267306 A1 | 5/1988 |
| EP | 2267306 A2 | 12/2010 |
| EP | 2602898 A2 | 6/2013 |
| EP | 3080888 A1 | 10/2016 |
| WO | 2015086022 A1 | 6/2015 |
| WO | 2019120400 A1 | 6/2019 |

OTHER PUBLICATIONS

PCT Notification of Transmittal of the International Search Report and the Written Opinion of the International Searching Authority, or the Declaration for Application No. PCT/DK2018/050305 dated Jan. 17, 2019.

European Patent Office Action for Application No. 18 811 438.3-1202 dated Jul. 22, 2021.

China National Intellectual Property Administration, First Office Action for Application 2018800784265 dated Jan. 20, 2023.

Intellectual Property India, Examination Report under Sections 12 & 13 of the Patents Act, 1970 and the Patents Rules, 2003, for Application 202017026421 dated Jan. 27, 2023.

* cited by examiner

CURRENT INJECTION IN WIND POWER PLANTS

TECHNICAL FIELD

The present invention relates to a method of controlling a renewable energy power plant, to a renewable energy power plant controller, and to a wind turbine power plant more generally.

BACKGROUND

Newly commissioned renewable power plants, and more particularly wind power plants, are expected to be able to operate and adapt to a number of different circumstances when connected to a power network. A wind power plant (WPP) typically comprises a plurality of wind turbine generators and is also known as a wind park or a wind farm. The regulation and general operation of the power plant is controlled by a power plant control system or controller (PPC), which implements operational limits and requirements as set out by a Transmission System Operator (TSO) or in country-specific grid interconnection requirements or 'grid codes'. The TSO also communicates power delivery demands to the PPC, including active and/or reactive current delivery demands.

Grid codes commonly include specific requirements for reactive and/or active current supply during a fault. These requirements ensure that the network is fully supported throughout the fault and that voltage level recovery is sustained by the active and/or reactive current supplied by the wind power plant or plants.

While requirements used to be specified at each generating unit, the practice more recently, has been for grid code requirements for current supply levels to be specified at a Point of Interconnection (PoI) between the grid and the power plant. This allows for distributed current generation and flexibility in how the current is supplied to the grid by the power plant. However, it also often results in grid code requirements not being met during faults. The reason for this is to permit fast reaction to a fault from the grid, thus the wind turbine generators act as autonomous current sources that are de-coupled from the control of the PPC during the fault. This is despite the requirements being specified for the PoI.

One approach to ensure that the requirements are met during a fault is to estimate, prior to installation of the power plant, the required injection profile for each wind turbine generator. One example of this is based on a linear weighting, or 'K-factor', as described in the German Grid Code and standard EN 50549. The K-factor is used as only reactive current control is specified, while there are no requirements for active current. However, any change in grid condition or to the WPP may result in non-compliance. Furthermore, new requirements for active current would not be able to be implemented by current systems using only a K-factor.

It is an aim of the present invention to improve upon the prior art.

SUMMARY OF THE INVENTION

According to an aspect of the present invention there is provided a method for controlling a renewable energy generator, the renewable energy generator being connected to a Point of Interconnection of an external power grid by a connecting network. The connecting network has an associated impedance level. The method comprises: monitoring at least one parameter of the connecting network and the voltage level at the Point of Interconnection; generating, during normal operating conditions, at least one current injection profile based upon the at least one measured parameter and a predetermined injection profile: and operating the renewable energy generator, during a grid fault, to output current according to the at least one current injection profile, so as to achieve a current set point at the Point of Interconnection.

Advantageously, generating current injection profiles during normal operation facilitates the generation of more accurate injection profiles, due to the parameters available for monitoring. The operation of the generator according to those profiles during a grid fault results in immediate compliance with grid code requirements. This means that the power plant that the generator forms part of is able to support grid recovery immediately, reducing the likelihood of disconnection or damage to the system.

Is to be understood that the at least one parameter is monitored at a point being significant different from the Point of Interconnection. Thus, the parameter should reflect properties of the connection network and not the Point of Interconnection, save for cases where there the properties are identical.

Generating, during normal operating conditions at least one current injection profile may comprise calculating a voltage function.

A voltage function beneficially ensures a straightforward calculation that can be made very quickly by a control system to achieve fast adoption of the correct output current level.

The voltage function may comprise at least one weighting. The voltage function may require an input of voltage measured at a point between the renewable energy generator and a low voltage transformer of the connecting network only.

In requiring only a single input, here voltage level at a point in the connector network, arrival at an output current level requires minimal computing. The point between the renewable energy generator and the low voltage transformer of the connecting network may be a terminal of the renewable energy generator.

The current injection profile may be an active current injection profile. The current injection profile may be a reactive current injection profile. The voltage function may be a first order polynomial, a second order polynomial, a third order polynomial, a fourth order polynomial, or a polynomial of a higher order.

The predetermined injection profile upon which the at least one current injection profile may be an earlier iteration of the current injection profile.

Iteratively updating an injection profile further reduces the computational power required to implement this method, permitting its use in existing power plants and with existing generators.

The step of generating, during normal operating conditions, at least one current injection profile based upon the at least one monitored parameter and a predetermined injection profile may be performed at intervals while normal operating conditions persist, such that the injection profile is updated iteratively.

For example, the generation may be performed at intervals as requested by an external system, or according to a predetermined period, or when a change in a particular monitored parameter is identified. Usefully, generating updated injection profiles through a period of normal operation results in an up-to-date profile when required, such that the output of the generator is compliant at the Point of Interconnection.

The at least one parameter may be voltage level measured at a point in the connecting network between the Point of Interconnection and the renewable energy generator. It is to be understood that the voltage level should be measured sufficiently remote from the Point of Interconnection such that the measurement reflects the voltage level at a point in the connection network and not at the Point of Interconnection.

The at least one parameter may be voltage level measured at a point in the connecting network between the low-voltage transformer and the renewable energy generator.

The at least one parameter may be impedance of the connecting network.

The current set point may be based on grid code requirements.

The method may comprise updating a stored current injection profile once a new current injection profile has been generated.

The method may comprise setting a default current injection profile. The default current injection profile may be the predetermined injection profile for the first iteration of the generating step.

According to another aspect of the invention, there is provided a renewable energy power plant comprising a plurality of renewable energy generators and a control system for controlling the current output of the plurality of renewable energy generators, a power network connecting those renewable energy generators to a Point of Interconnection (PoI) with which the power network is connected to an external power grid, and measurement means configured to measure electrical parameters associated with the Point of Interconnection. The control system is configured to: generate, during normal operating conditions, at least one current injection profile based upon at least one of the measured electrical parameters and a predetermined injection profile; and operate the renewable energy generator, during a grid fault, to output power according to the generated profile such that the current level injected by the generator to the connecting network results in a current set point being met at the Point of Interconnection.

According to another aspect of the invention, there is provided a computer program downloadable from a communication network and/or stored on a machine readable medium, comprising program code instructions for implementing a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
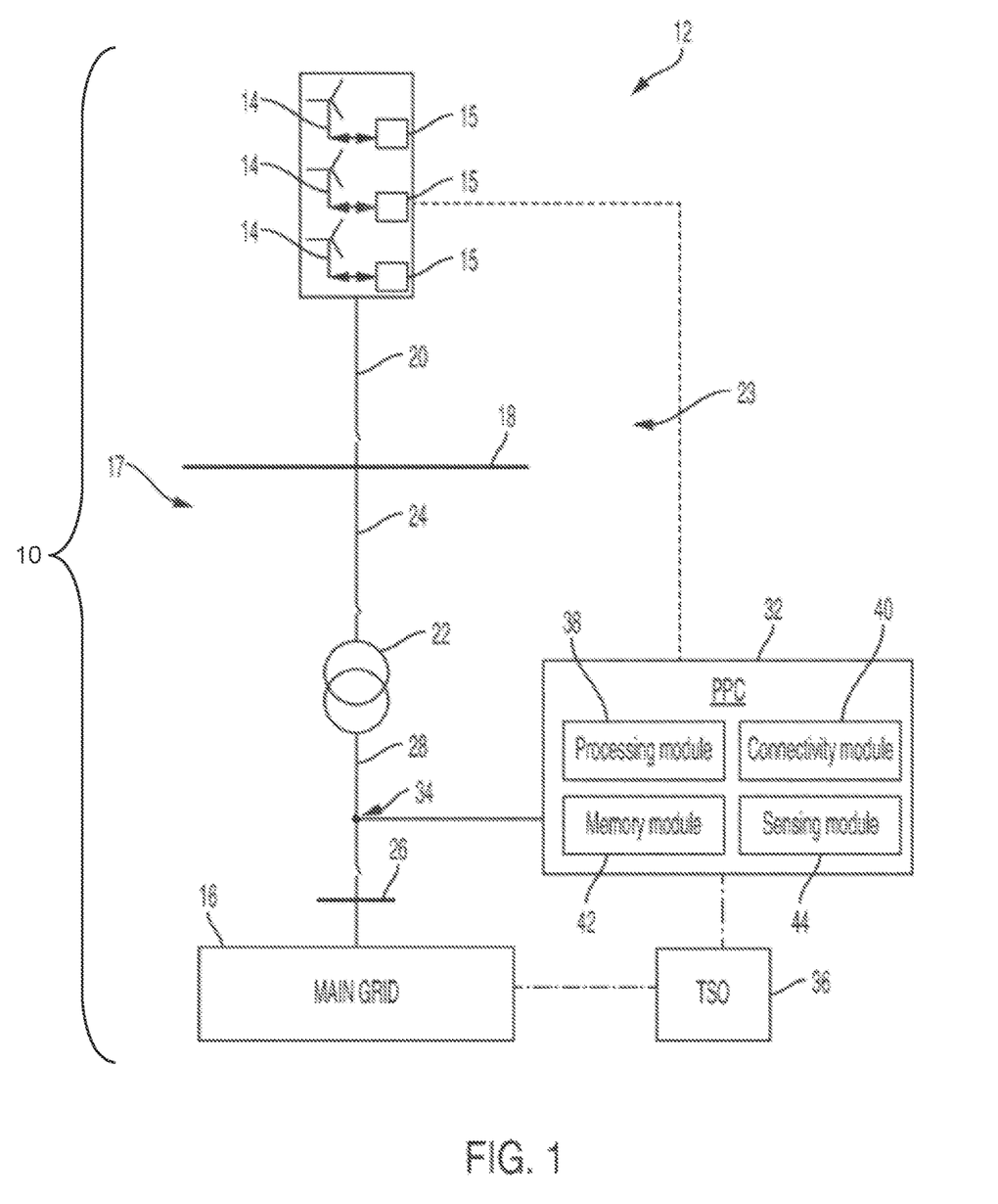
FIG. 1 is a schematic view of a power network including a wind power plant and a main grid according to an embodiment of the invention.

FIG. 1 illustrates a typical architecture in which a wind power plant (WPP) is connected to a main transmission grid as part of a wider power network. The example shown is representative only and the skilled reader will appreciate other specific architectures are possible, in relation to both wind power plants and power plants for other renewable energy sources. In addition, the skilled reader will appreciate that methods, systems and techniques also described below may be applicable to many different configurations of power network. Moreover, the components of the wind power plant and power network are conventional and as such would be familiar to the skilled reader. In particular, while a WPP is described herein as having a plurality of wind turbine generators, it will be appreciated that the WPP may also be considered to comprise STATCOM equipment, substation equipment, cables, plant controllers, and other componentry required to connect the WPP to a main grid.

FIG. 1 shows a power network 10 incorporating a wind power plant (WPP) 12 including a plurality of wind turbine generators 14 (WTGs), often more commonly called 'wind turbines'. Each of the plurality of WTGs 14 converts wind energy into electrical energy, which is transferred from the WTGs 14 to a main transmission power network 16 or main grid, as active current, for distribution. A connecting network 17 extends between the WPP 12 and the main grid 16.

WTGs 14 generate both active current and reactive current. The main grid 16 often has specific active and reactive current requirements with which the WPP 12 is required to comply, and the output of the WTGs 14 can be changed to match these requirements in real time. In particular, grid requirements specify current levels required to support voltage levels of the main grid 16 during a grid fault, and the output of WTGs 14 can be manipulated to meet these. The method and system described herein according to embodiments of the invention act to ensure that the output of the WTGs 14, and hence the WPP 12, is sufficient to overcome impedances in the system 10 between the grid 16 and the WTGs 14 and to supply a required and correct amount of current as necessary. The method and system implement feed-forward voltage control that may be applied to any renewable energy power plant or network, and that ensures that active and reactive current requirements are met immediately during a fault. The implementation of such feed-forward voltage control ensure that complex calculations are not required to be performed at any time to ensure compliance of the WPP 12.

Returning to FIG. 1, each of the WTGs 14 of the WPP 12 is connected to a local grid (not shown) that links the WTGs 14. The WPP 12 is, in turn, suitably connected to a collector bus 18 via a feeder line 20. The collector bus 18 may be at an intermediate voltage level that is suitable for relatively short distance power transmission, for example in the region of 10 kV to 36 kV. The collector bus 18 may also provide a point of common coupling (PCC) for a plurality of wind power plants, although, only a single WPP 12 is shown here for simplicity.

The collector bus 18 is connected to a main step-up transformer 22 by a transmission line 24. The main transformer 22 is in turn connected to the main grid 16 at a Point of Interconnection (PoI) 26 by another transmission line 28. The PoI 26 is an interface between the WPP 12 and the main grid 16, such that the connecting network 17 extends between the WPP 12 and the PoI 26, thereby connecting the WPP 12 to the main grid 16. It will be appreciated that more transformers may be included within the connecting network 17 as required.

While the collector bus 18 may be required to span distances up to around 100 km, the main grid 16 may be an international, national, or regional grid such as the National Grid of Great Britain, for example, and therefore may be required to span distances of up to around 250 km or more. Accordingly, the voltage level of the main grid 16 may be much higher than the voltage level of the collector bus 18 for better transmission efficiency.

Hereinafter, it should be assumed that references to components being connected or connections between components comprise suitable feeder or transmission lines as described above unless it is otherwise indicated.

A Power Plant Controller (PPC) 32 is connected to the power network 10 at a Point of Measurement (PoM) 34 and is also connected directly to the WPP 12. The role of the PPC 32 is to act as a command and control interface between the WPP 12 and a grid operator or transmission system operator (TSO) 36. The TSO 36 is responsible for indicating the needs and requirements of the main grid 16 to the PPC 32. The PPC 32, in its role as command and control interface, interprets the power delivery demands requested of it by the TSO 36 and manages the wind turbines 14 in the WPP 12 in order to satisfy those requirements, whilst taking into account other operative factors such as grid faults and sudden changes in output or measured grid voltage.

The PPC 32 is a suitable computer system for carrying out the controls and commands as described above and so incorporates at least a processing module 38, a connectivity module 40, a memory module 42 and a sensing module 44.

In order to monitor and regulate the output of the WPP 12 and to interpret the power demands correctly, the PPC 32 is connected to the transmission line 28 between the main transformer 22 and the PoI 26 at the PoM 34. The PPC 32 is equipped to measure a variety of parameters including a representative power output that will be supplied to the main grid 16 at the PoI 26 by the WPP 12. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

In addition, the PPC 32 measures parameters of the power output such as a frequency and voltage, as well as reactive current exchange between the WPP 12 and the main grid 16 and the voltage level of the main grid 16. The PPC 32 compares the measured parameters against specific grid requirements and communicates control commands to specific components of the WPP 12 accordingly. The WPP 12 is capable of altering its reactive current output in reaction to commands received from the PPC 32.

The PPC 32 communicates control commands to the turbines 14 in a suitable manner. It will be noted that FIG. 1 is a schematic view, so the way in which the control commands are transferred to the turbines 14 is not depicted explicitly. However, it will be appreciated that suitable cabling may be provided to interconnect the PPC 32 and the turbines 14. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFim or ZigBeem standards (IEEE802.11 and 802.15.4 respectively).

The diagram of FIG. 1 should only be taken as a representation of a power network. Alternative configurations of power network and power plants are known and it is expected that other known components may be incorporated in addition to or as alternatives to the components shown and described in FIG. 1. Such changes would be within the capabilities of the skilled person. For example, substations or extra transformers would be expected to be incorporated in the wind power plant depending upon the number of turbines included in the plurality of wind turbines.

In some embodiments, the PoM 34 may be positioned at a different position in the system such that the parameters measured by the PPC 32 are not representative of the actual values for those parameters at the PoI 26 and the values may differ. In this case, a correction factor may be applied to the measurements to adjust for the different position of the PoM 34 relative to the PoI 26. It therefore does not matter where the PoM 34 is located with regard to the PoI 26, so long as there is a predetermined correction factor. Therefore, the measured voltage may be indicative of, or associated with, the voltage at the point of interconnection, even if the voltage is not measured directly at that location.

For the purposes of the present application, it is assumed that the PoM 34 is at same location as the PoI 26, and subsequent references to measurements will only be made with reference to the PoI 26. It will be appreciated, as discussed above, that the PoM 34 may be positioned at a different position and the difference in magnitude of each measurement due to this different position may be accounted for with a correction factor without affecting the operation of the system.

As described above, the WPP 12 must comply with a set of grid requirements specific to the main grid 16. In particular, the operation of the PPC 32 and WPP 12 in reaction to a grid fault is especially important. The reaction to a grid fault requires careful control of both voltage and power outputs to firstly fulfil grid requirements and secondly to support the grid 16 to enable an efficient recovery to normal operating voltage levels.

As will be understood by the skilled person, a grid fault, or grid fault event, is generally defined as a period in which the voltage level of the grid 16 or wider power network drops to a level outside the accepted and normal operational voltage bounds. During a grid fault in which grid voltage levels drop below predefined thresholds, the WPP 12 operates in an under-voltage mode, such as an under-voltage ride through (UVRT) mode, to avoid disconnection of the WPP 12 from the grid 16 and to support the grid 16 through the fault (under-voltage ride through is also known as low voltage ride through). In the under-voltage mode, the WPP 12 supports the grid 16 during the fault by supplying reactive current to encourage a rise in voltage levels. The WPP 12 is required to supply reactive current until the voltage levels have returned to levels that are within a normal operating voltage band. In many circumstances, this operating band is between voltage levels of 0.9 per-unit (pu) voltage and 1.1 pu voltage.

The WPP 12 may alternatively experience a grid fault in which grid voltage levels rise above normal operational levels, and the WPP 12 may operate in an over-voltage mode, such as an over-voltage ride through (OVRT) mode, in these situations. Under-voltage situations are discussed throughout this specification, but it will be appreciated that the principles are equally applicable to over-voltage situations.

As would be understood by the skilled person, per-unit voltage is an expression of the voltage with respect to a base value which is used as a reference. Similarly, per-unit active current, or per-unit reactive current is an expression of the power/current with respect to a reference base value. Using a per-unit system allows for normalization of values across transformers and other components that may change the value by an order of magnitude.

When operating in the under-voltage mode, the WTGs 14 of the WPP 12 act autonomously and are controlled by WTG controllers 15 instead of being controlled by the PPC 32 as would ordinarily happen in normal voltage modes. The WTGs 14 are controlled to output active and reactive current based on the voltage levels measured at a predetermined position. For example, the measurement may be made across the individual terminals of the WTGs 14 or at a point in the connecting network 17 on the low-voltage side 23 of the transformer 22, where the low-voltage side 23 of the transformer 22 extends between the WPP 12 and the transformer 22. However, the grid requirements for active and reactive current are specified at the PoI 26, and not for individual WTGs 14. As the collector network 17 has an associated impedance, a difference exists between the measured active or reactive current output across the terminal of each WTG 14 and the measured output at the PoI 26.

Figure 2:
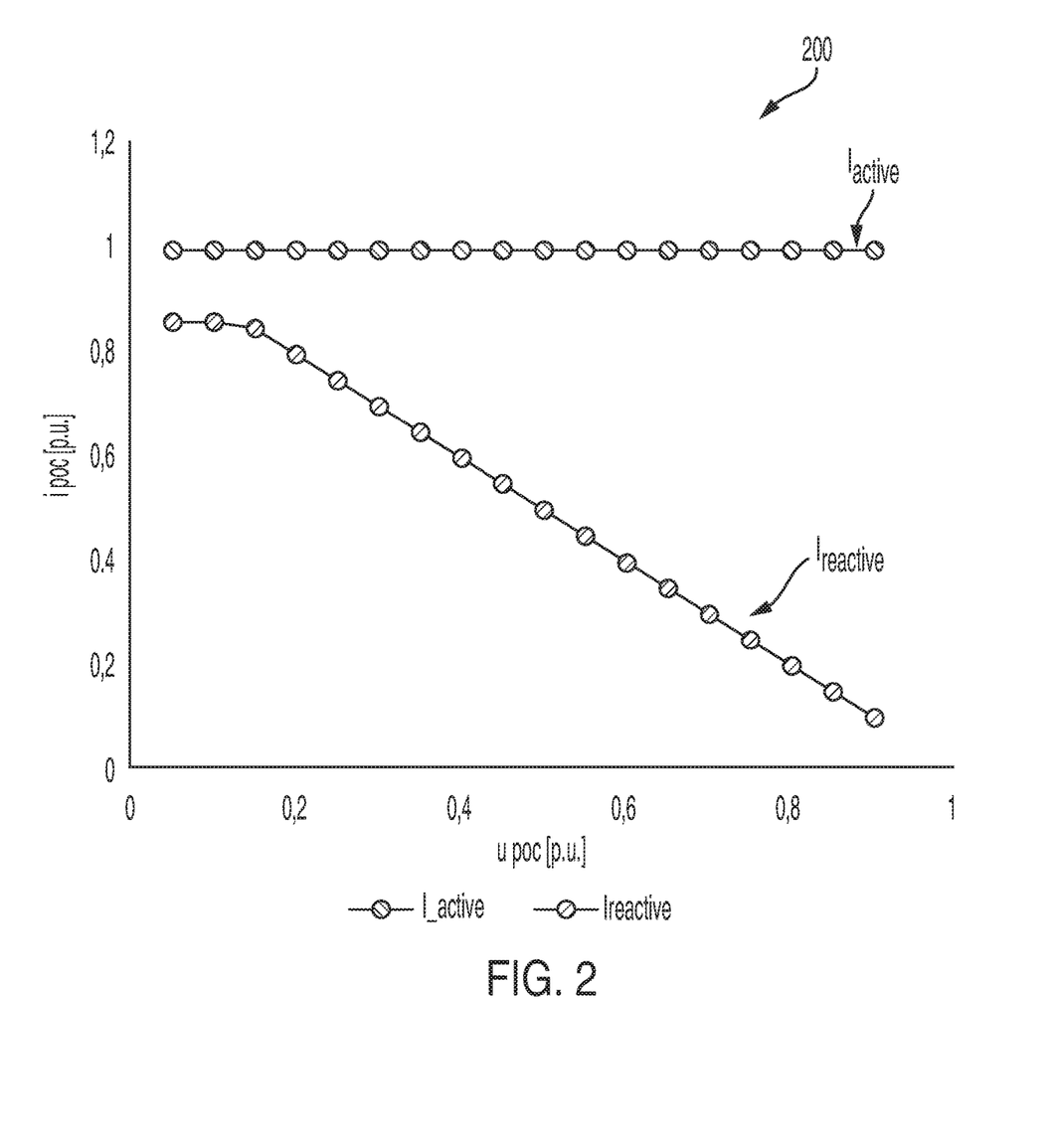
FIG. 2 is a chart outlining grid code requirements for active current and reactive current as a function of voltage specified for the Point of Interconnection (PoI)

Examples of active current and reactive current grid code requirements, which are to be met at the PoI 26, are shown in the chart 200 of FIG. 2. In FIG. 2, it can be seen that the grid requirement for active current output, the line for which is labelled at the PoI 26 is 1 pu active current at all voltage levels between 0.05 pu and 0.9 pu voltage. FIG. 2 also illustrates that the grid requirements for reactive current output level at the PoI 26, labelled '$I_{reactive}$', adopt a linear relationship between 0.8 pu reactive current at 0.2 pu voltage and 0.1 pu reactive current at 0.9 pu voltage, and between 0.8 pu and 0.85 pu reactive current at voltage levels below 0.2 pu voltage.

It has already been discussed that collector networks 17 and, more generally, all componentry used in electrical systems, have an associated impedance. The consequence of this impedance is that active current or reactive current injected at one point in power network will not be replicated at another point in the power network, but will, in fact, be altered. The impedance of the system results in changes in active and reactive current levels at different points on the network. So, if an operator were to control a WTG 14 to output active current and reactive current according to the grid code requirements of FIG. 2, without consideration for the impedance of the system, the outputs would be very different elsewhere in the network 10. While the output at the WTG terminal would mirror the graph shown in FIG. 2, the collector network 17's impedance will result in very different active and reactive current profiles at the PoI 26. The chart 300 of FIG. 3 illustrates an example of this scenario.

Figure 3:
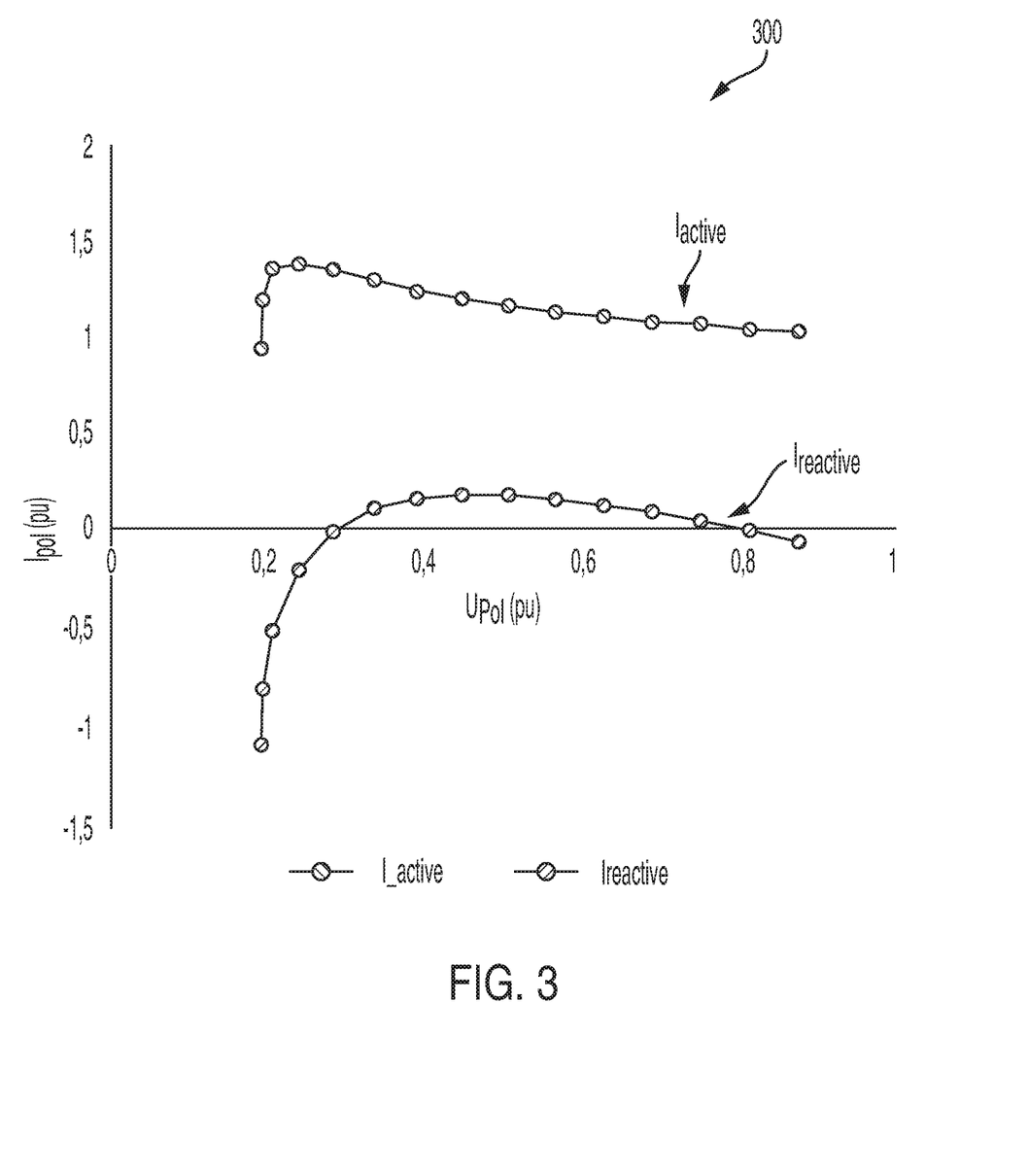
FIG. 3 is a chart outlining PoI active current and reactive current as a function of voltage in response to the injection profiles of FIG. 2 being implemented at each wind turbine generator.

In the chart 300 of FIG. 3, it can be seen that active current level achieved at the PoI 26 is well above the required levels, varying substantially between 0.2 and 0.9 pu voltage. It can also be seen, that below 0.2 pu voltage, output levels of active current from the WTG 14 would result in non-compliance of the WPP 12 at the PoI 26. FIG. 3 also shows that reactive current at the PoI 26 would be non-compliant at all voltage levels.

Figure 4:
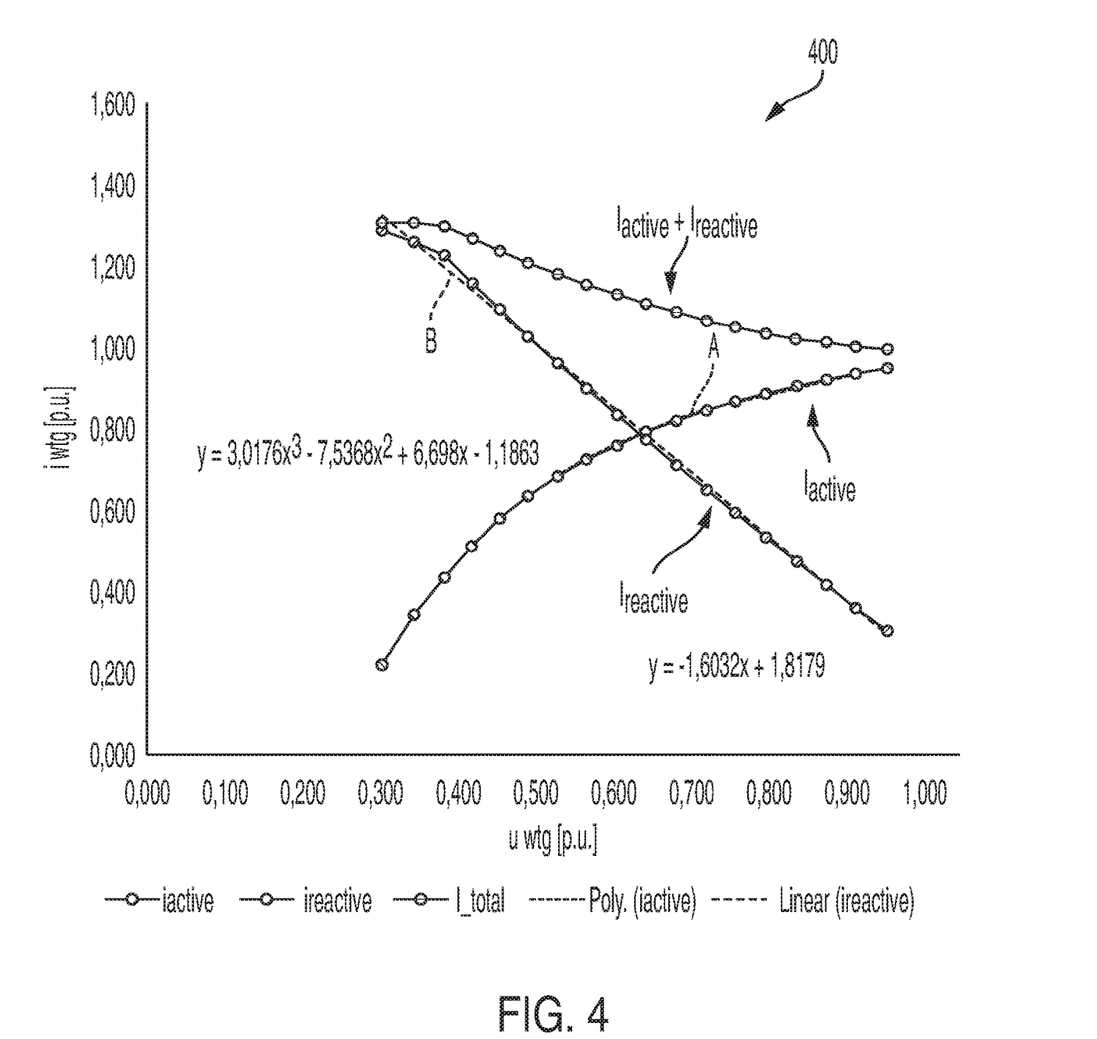
FIG. 4 is a chart outlining required output of active current and reactive current for a given impedance between the wind turbine generator and the PoI as a function of voltage at the terminal of a wind turbine generator to replicate the profiles shown in FIG. 2 at the PoI.

Therefore, to be compliant at the PoI 26, WTG injection profiles during grid faults must be quite different. FIG. 4 shows an example chart 400 illustrating typical active current ($I_{active}$) and reactive current ($I_{reactive}$) WTG injection profiles. Implementing these profiles at the WTGs 14 would result in compliant active and reactive current levels at the PoI 26 for a particular network. Also shown in FIG. 4 is the total current ($I_{active}+I_{reactive}$) supplied by the WTG at each voltage level, as well as trendlines, A and B, which will be discussed later. While FIG. 4 only shows values upwards of 0.3 pu voltage, it will be appreciated that the injection profile may be calculated below this value.

Using the profiles of FIG. 4, in order to achieve compliance at the PoI 26 by realising an active current output level of 1 pu active current at all voltages at the PoI 26, the WTG 14 must produce a varying amount of active current that increases with increasing voltage. For example, for the particular network on which the values in FIG. 4 are based, if the measured voltage is 0.4 pu voltage, the grid requirement active current level is 1 pu active current, and to achieve this level, the output active current from the WTG 14 must be 0.5 pu active current.

It should also be considered that at the same time as outputting 0.5 pu active current, the WTG 14 is required to produce 1.2 pu reactive current for a measured voltage of 0.4 pu voltage.

Similarly, from FIG. 2 it is shown that, to achieve compliance of reactive current output level at the PoI 26, a linear requirement exists between 0.8 pu reactive current at 0.2 pu voltage and 0.1 pu reactive current at 0.9 pu voltage. The corresponding WTG requirements for the particular network are shown in FIG. 4, including a corresponding linear injection profile that extends between approximately 1.3 pu and 0.3 pu reactive current for voltage levels between 0.3 pu and 0.95 pu voltage. For a measured voltage level of 0.4 pu voltage, the reactive current level required by the grid requirements is 0.6 pu reactive current, and, according to FIG. 4, the WTG 14 must supply 1.2 pu reactive current.

Compliance in terms of the grid requirement is achieved through a combination of reactive and active current injection. The reactive current injected by each WTG 14 of the WPP 12 raises the voltage level at the terminal of that WTG 14.

It will be appreciated that the injection profiles illustrated in FIG. 4 are for example only, and in reality, collector networks 17 between the PoI 26 and the WTGs 14s for different systems may vary highly depending upon the type of components incorporated into the network, the interconnection type between the grid 16 and the WPP 12, the quality of the components incorporated, the quality of the power incorporated, the age of the network, and the grid type. Thus, the impedance of the collector network 17 may vary, and this would result in different injection profiles. It is useful, therefore, to have a variable injection profile, as discussed below.

To achieve the correct levels at the PoI 26 according to the grid code, conventional practice is to perform simulations of the operation of a WPP and collector network 17 prior to installation of that WPP and collector network 17, and to use the results of these simulations to specify a single K-factor parameter for the WPP. This K-factor relates to reactive current only, and specifies the relationship between reactive power and voltage. The K-factor is permanently programmed into the operating modes of the WTG controllers of the WPP, such that during a grid fault, the injected reactive power will be according to a predetermined profile will be used regardless of changes to the connecting network 17. Put another way, there is no adaptation of the injection profiles, let alone automatic adaptation.

In these conventional situations, if the WTG output levels calculated for meeting the grid requirement levels are incorrect then the output at the PoI 26 will fall short of the levels specified by the grid requirements, and so the WPP 12 may not support the grid 16 satisfactorily during the fault. This may result in a deeper voltage dip, or prolonged fault length and no counteraction of the fault.

To ensure that in under-voltage mode the WTGs 14 operate to support the grid 16 sufficiently, a control method according to the invention may be implemented, in which reactive and active current levels at the PoI 26 are continuously compliant with grid code requirements using feed-forward voltage control to alter injection profiles based upon measurements made relating to the state of the connector network. The control method of the invention results in automatic adaptation to changes in the collector network 17 of the network 10, as well as other changes that may affect the compliance of the WPP 12. Furthermore, the control method ensures immediate compliance, providing a further advantage over other control methods.

Figure 5A:
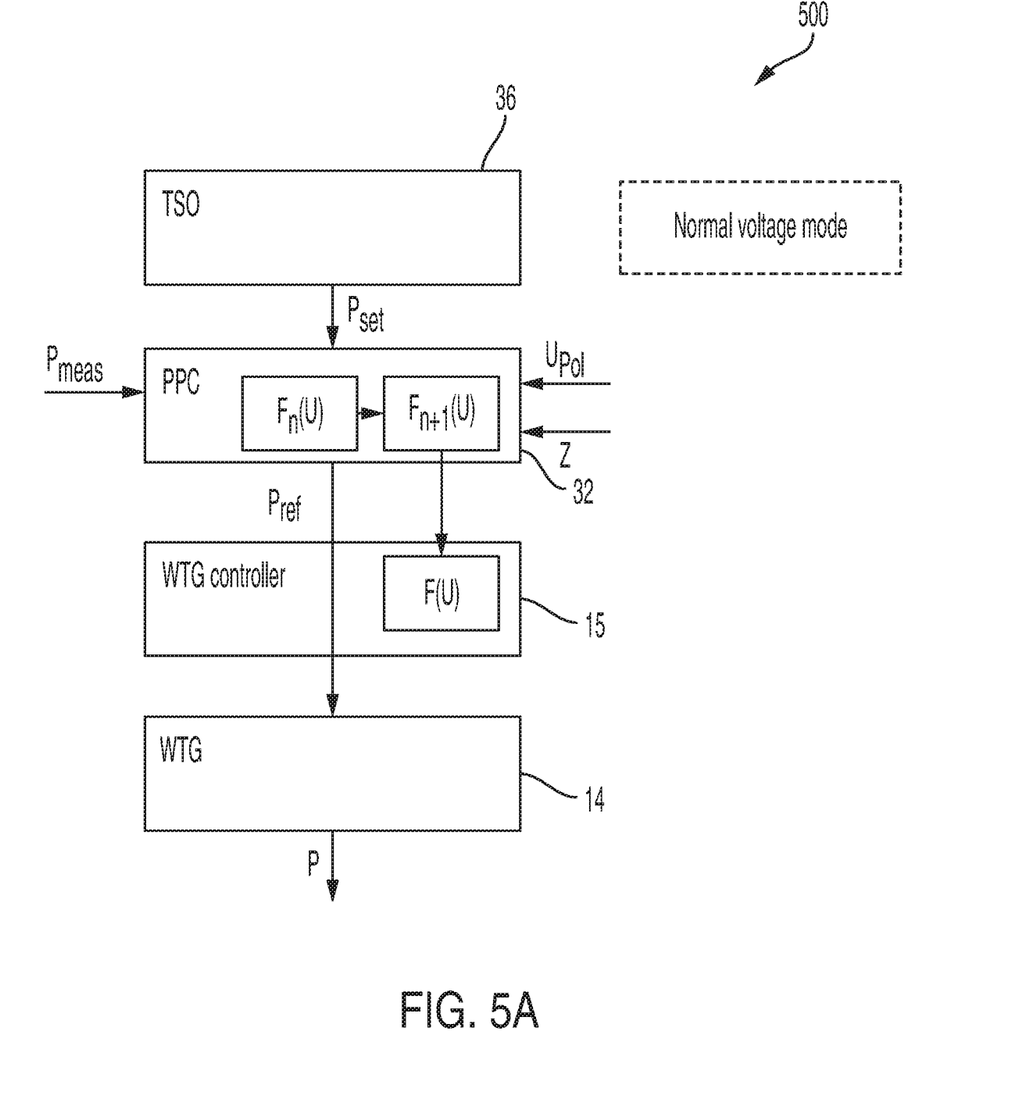
FIGS. 5a and 5b are information flow diagrams between elements of the power network for a normal voltage mode and an under-voltage mode respectively.
Figure 5B:
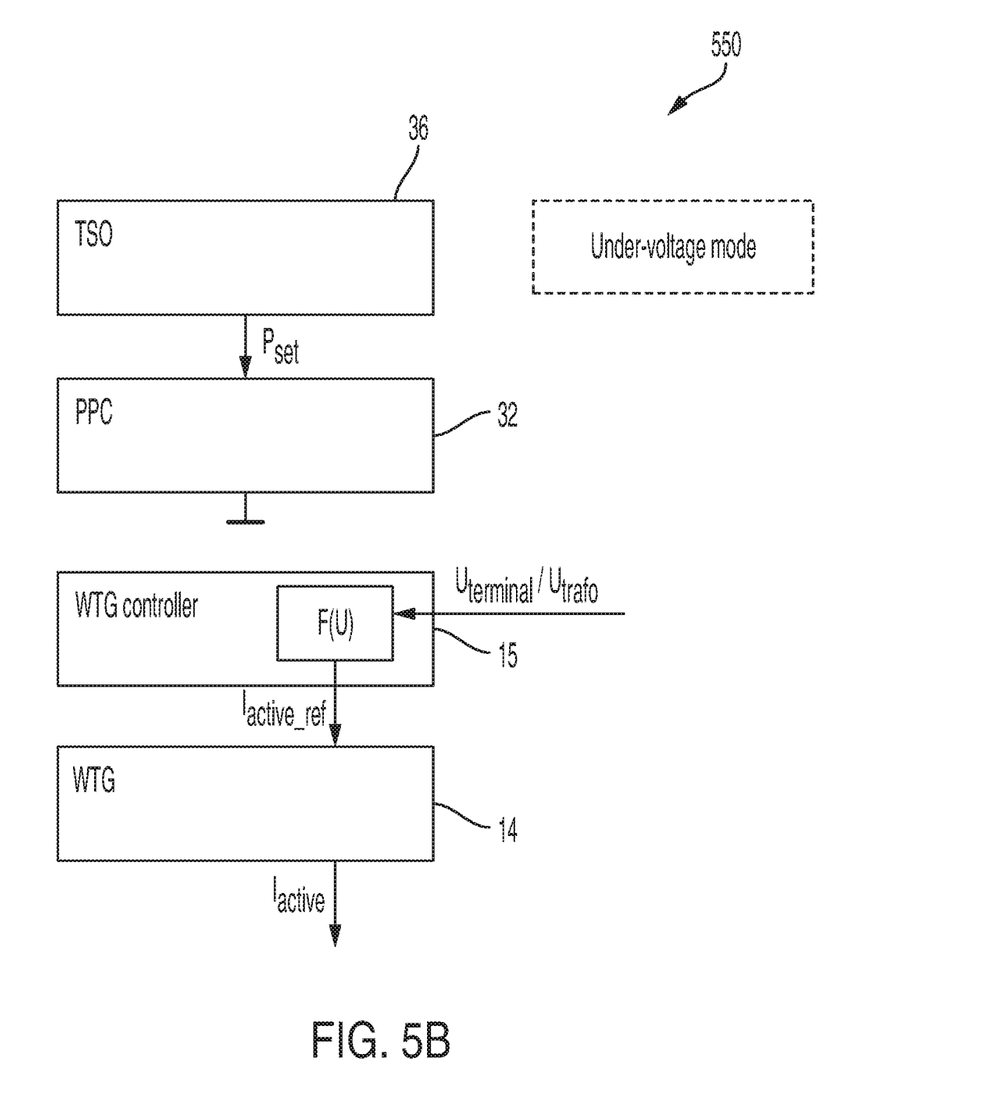
Figure 6:
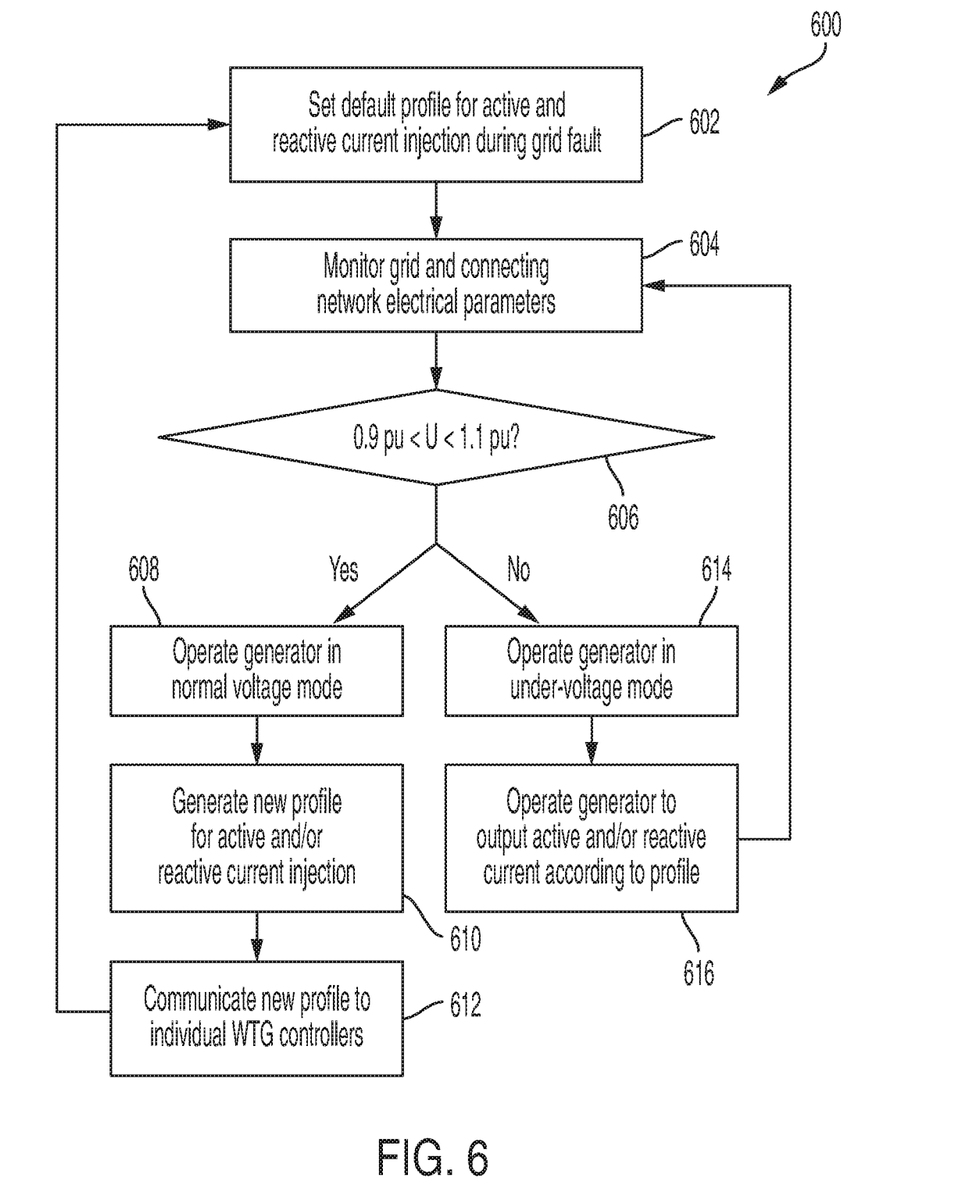
FIG. 6 is a flow chart illustrating a process governing the operation of a power network according to an embodiment of the invention.

FIGS. 5a and 5b show information flow diagrams 500, 550 between components of the power network 10 in normal voltage mode and under-voltage mode respectively. These diagrams demonstrate example flows of data or information according to an embodiment of the invention. FIG. 6 shows an example control method 600 according to an embodiment of the invention. The control method 600 governs the operation of the power network 10 to ensure that compliance is achieved during a grid fault. The flow diagrams 500, 550 and method 600 are applicable to both reactive power and current injection and active power and current injection, and would be substantially the same for each of reactive and active power and current injection. The method would be implemented for both reactive and active current injection during a fault, to ensure complete compliance of the WPP with the requirements. However, for clarity, only active power and current will be discussed in relation to these Figures.

Focusing initially on Figure 5a, the communication of information between the TSO 36, PPC 32, WTG controller 15 and WTG 14 is shown for when the WPP 12 is being operated according to a normal voltage mode. It will also be appreciated that only communications between components that are pertinent to the invention are shown in FIGS. 5a and 5b, so as not to impair the clarity of the Figures.

The term 'normal voltage mode' is used throughout this specification to designate the mode and protocols according to which each WTG 14 is operated when voltage levels are considered to be within their 'normal operating band'. As discussed above, this band is typically between 0.9 pu voltage and 1.1 pu voltage at the terminal at the WTGs 14, although this band may be variable and measured from an alternative location, such as the PoI. When WTGs 14 are being operated according to the normal voltage mode, the voltage level of the grid 16 is within this normal operating band, and both active current and reactive current set points are specified by the TSO 36, with the PPC 32 communicating active current reference values to the WTGs 14 via WTG controllers 15.

In FIG. 5a, the conventional information flow relating to active power generation under normal voltage conditions is shown, as well as the new information flow relating to generation of active current references in the under-voltage ride-through mode.

The conventional information flow comprises the TSO 36 communicating at least one active power set point, $P_{set}$, value to the PPC 32 and the PPC 32 formulating a plurality of active power reference, $P_{ref}$, values based upon the $P_{set}$ value. The $P_{set}$ value communicated by the TSO 36 is the level of active current injection required by the grid 16, with each power plant connected to the grid 16 being expected to supply active current at that level. $P_{ref}$ values are set by the PPC 32 as levels to be met by each WTG 14. The output of active current by the WTGs 14 according to the $P_{ref}$ values specified by the PPC will result in the active power level at the PoI 26 being equal to $P_{set}$. Once the $P_{ref}$ values have been generated by the PPC 32, they are distributed, via the WTG controllers 15, to individual WTGs 14. The WTGs 14 then generate and output active power, P, at a level equal or similar to the $P_{ref}$ values.

The $P_{ref}$ values distributed by the PPC 32 may be the same for each WTG 14 or different, depending upon the control method employed by the PPC 32, and the PPC 32 may use measurements to refine $P_{ref}$ values to bring the output of the WTGs 14 closer to $P_{set}$.

As part of the conventional flow, it can also be seen in FIG. 5a that the PPC 32 also monitors parameters at the PoM 34, such as a measured active power output level, $P_{meas}$, at the PoM 34. The measured active power output level is used as part of a closed loop to continually update to $P_{ref}$ values to ensure that $P_{meas}$ is in line with $P_{set}$. At least some of the parameters monitored by the PPC 32 are utilised in the new information flow to update a pre-programmed injection profile, in the form of a voltage function, thereby generating a new injection profile for active current injection during a grid fault. The example parameters shown in FIG. 5a are voltage level of the grid, $U_{grid}$, and the impedance of the collector network, Z, and these may be monitored directly or indirectly. The voltage function, indicated here as $F_n(U)$, is a predetermined voltage function whose output is an active current injection profile for use by WTGs 14 during a grid fault. The function requires a single input variable of voltage level at a known position in the connector network 17, such as the WTG terminal or point in the low voltage side 23 of the transformer 22. The function also includes a plurality of weights that are matched to an earlier state of the connector network 17 at a point in time, $t_n$, such that input of the voltage level in the under-voltage mode results in active current output from the WPP 12 that translates to compliance with the grid code requirements at the PoI 26.

The voltage function is pre-programmed within the PPC 32 and is updated based upon the monitored parameters to result in a new injection profile, again in the form of a voltage function. This new voltage function is labelled $F_{n+1}(U)$. The pre-programmed function, $F_n(U)$, is either pre-programmed into the PPC 32 prior to the WPP 12 commencing operation, or pre-programmed in the sense that it is a previous iteration of the voltage function that has been previously used as $F_{n+1}(U)$.

The pre-programmed function $F_n(U)$ can be considered to be a voltage function that is matched to the connector network 17 at time $t_n$, and would be sufficient to provide compliance if a grid fault were to occur at that point in time. The new voltage function $F_{n+1}(U)$ is an update to $F_n(U)$ for a later time $t_{n+1}$, and is matched to the connector network 17 at that later time. The update applied to the pre-programmed function takes into account changes in the connector network 17 that may affect the compliance of the WTGs 14 if controlled according to the earlier function. This method of operation therefore results in a feed-forward voltage control that adapts to changes in the connector network by iteratively updating a pre-programmed voltage function according to measured parameters.

Having generated an updated voltage function, the function is communicated by the PPC 32 to individual WTG controllers 15. The WTG controllers 15 store the updated function, overwriting the previous stored iteration.

Although not shown in FIG. 5a, once an updated function $F_{n+1}(U)$ is calculated, this is then also stored within the PPC 32 as $F_n(U)$, so that further updates can be subsequently performed in later iterations of the method.

Both flows shown in the diagram 500 of FIG. 5a, i.e. the flow for outputting active power and the flow for generating injection profiles that will be used in response to a fault, are performed continuously or at pre-determined intervals, such that any alterations in the condition of the grid 16 or the connecting network 17 are accounted for and will not result in non-compliance. By continuously updating the injection profiles, changes in the connecting network, such as replacing a transformed, removing components within the network for maintenance, or moving a connection point to a different substation, will be accounted for so that the injection of active current during a grid fault will be compliant.

Although only one voltage function is distributed to WTG controllers in the above discussion, it will be appreciated that it is also possible to distribute WTG-specific functions to individual WTG controllers to account for differences in the local grid to which the WTGs connect initially. This is particularly useful in widely distributed WPPs, so that impedance differences are accounted for across the entire collector network.

Example functions are shown in FIG. 4 by trendlines A, B. Trendline A is the result of a function generated for the network to ensure compliance of active current requirements at the PoI 26, and corresponds to a third-order polynomial having the equation:

$$y=3.0176x^3-7.5368x^2+6.698x-1.1863$$

Similarly, trendline B is a linear function that corresponds to the compliance curve for reactive current. Trendline B is characterised by the equation:

$$z=-1.6032x+1.8179$$

In these equations, y corresponds to active current output, z to reactive current output, while x is voltage level, each expressed as per-unit values.

So, in generating a new function according to the method described herein, a PPC 32 would update the weightings of the first equation to match any changes to the measured values of the monitored parameters. In some embodiments, there may be a direct relationship between the change of a particular value and the change in each of the weightings within the equation. In alternative embodiments, the change may be used to update a model, or in some embodiments, the weightings may be completely recalculated based upon a new value.

Moreover, several different monitored parameters may be employed to alter the weightings, and in embodiments the weightings may be based on one parameter only, such as impedance value or angle of impedance, or may be based on a plurality of parameters. In some embodiments, a plurality of parameters may be used to calculate a further parameter on which the weightings are based. For example, if it is not possible to measure the impedance of the connecting network 17 directly, then a calculation of the impedance may be performed based on the active and reactive current at the PoI 26 and the sum of the active and reactive current measured at a point close to the WTGs 14, for example on the low-voltage side of the transformer 22.

In one embodiment, the weightings may initially be calculated using the following method.

Initially, the chart 200 shown in FIG. 2 for both $I_{active}$ and/or $I_{reactive}$ is generated as a vector, $I_{PoI}$.

It is then assumed that either the voltage on the PoI doesn't have an angle or that it does and the voltage level at the PoI, $U_{PoI}$, can be used as a reference.

The voltage drop, $U_Z$, should then be calculated across the impedance, Z, for the given current, $I_{PoI}$, using:

$$U_Z = I_{PoI} * Z$$

A vector, $U_{WTG}$, is calculated for the voltage at the WTG terminal based on summing $U_z$ and $U_{PoI}$.

An apparent power at the WTG terminals is calculated, $S_{WTG}$, where $S_{WTG}$, is the product of WTG terminal voltage vector and the conjugate of $I_{PoI}$. Shown another way:

$$S_{WTG} = U_{WTG} * I_{PoI}*$$

Assuming that the voltage at the WTG terminal, seen from the WTG, has an angle of zero, the $I_{active}$ and $I_{reactive}$ values can be calculated as:

$$I_{active} = \frac{\text{Real}(S_{WTG})}{\text{abs}(U_{WTG})}$$

and $$I_{reactive} = \frac{\text{Imag}(S_{WTG})}{\text{abs}(U_{WTG})}$$

The final steps requires plotting each of $I_{active}$ and $I_{reactive}$ against $U_{WTG}$ and generating a curve for each, typically a $3^{rd}$ order estimation for $I_{active}$ and a linear estimation for $I_{reactive}$, and outputting the weightings required for each of these curves. It will be appreciated that other estimations may be used.

Following determination of these values, changes in the values may then be utilised to quickly update the previous iteration of the function to generate a new function.

Turning now to FIG. 5b, the operation of the TSO 36, PPC 32, WTG controller 15 and WTG 14 during an under-voltage mode are shown. In this mode, the WTGs 14 of the WPP 12 act autonomously and are controlled by WTG controllers 15 instead of being controlled by the PPC 32 as happens in normal voltage mode. The WTGs 14 are controlled by their WTG controller 15 to output active and reactive current based on the voltage levels measured across their individual terminals, $U_{terminal}$, or based on voltage measurements at a point in the connecting network 17 on the low-voltage side 23 of the transformer 22, $U_{trafo}$.

In response to the under-voltage mode, each WTG controller 15 controls its WTG 14 according to the injection profile function, here labelled F(U), that was generated by the PPC 32 during the normal voltage mode. Using the function, and the measured voltage level $U_{terminal}$ or $U_{trafo}$, active current reference, $I_{active\_ref}$ values are generated by the WTG controller 15 for communicating to the WTG 14, which in turn outputs active current, $I_{active}$, according to the $I_{active\_ref}$ values.

Therefore, the WTG 14 is operated according to a set injection profile throughout the fault and for as long as the under-voltage mode is active. The injection profile, an example of which has already been discussed in relation to FIG. 4, is dependent only upon the voltage level measured at the terminal of a WTG 14 or transformer 22. Once the fault is cleared, under-voltage mode is terminated, and the system returns to its normal voltage mode, updating the injection profiles continues, and the $P_{ref}$ values are supplied by the PPC 32 again, as shown in FIG. 5*a*.

The operation of the WTGs 14 can be expressed as a method 600, as shown in FIG. 6. The method 600 of FIG. 6 is only one method by which the above modes can be implemented, and the skilled person would readily understand that the operation of the PPC 32 to update an active or reactive current injection profile according to measured parameters in a normal voltage mode, and the implementation of those profiles during an under-voltage mode by a WTG controller 15 may be performed in many different ways. In some alternative embodiments, the order of the method steps of FIG. 6 may be switched or altered.

In the first step of the method 600, a default profile is set 602 for active or reactive current injection. This step corresponds to the updating of the function/injection profile shown in FIG. 5*a*. As discussed in relation to that figure, the default profile may be a pre-installation estimated profile, or the most recently generated injection profile.

In either case, once the default profile has been set 602, electrical parameters of the grid 16 and connecting network are monitored 604. For example, the voltage of the grid 16 and the impedance of the connecting network 17 may be monitored.

Having measured/monitored 604 the voltage level, a check 606 is performed, in which it is determined if voltage levels have deviated from the normal operating bounds. If the voltage level is within the normal operating bounds, here given their conventional values of 0.9 pu and 1.1 pu, then the WPP 12, and more importantly the WTGs 14 are operated 608 in the normal voltage mode.

As discussed above, in the normal voltage mode, the PPC 32, using the monitored parameters and the default profile previously set, generates 610 a new injection profile for active and/or reactive current injection. Once this new injection profile has been generated 610, it is communicated 612 to the individual WTG controllers 15. It is likely that each WTG controller 15 will receive an injection profile that is specific to it due to changes in impedance introduced by the local grid to which the WTGs 14 of the WPP 12 are connected.

Having communicated 612 the new profiles to the individual WTG controllers 15, the default profile of the PPC 32 is updated, i.e. set 602, and the method 600 begins again.

If, however, during the voltage check step 606, it is determined that a voltage deviation has occurred, and as such a fault has occurred, then an under-voltage mode 614 is entered in which each WTG 14 acts autonomously from the PPC 32. In this under-voltage mode, the WTGs 14 are operated 616 according to the most recently received injection profile. While the fault is continuing, the method 600 returns to the monitoring step 604, and the parameters are monitored. The under-voltage mode is terminated only when the voltage returns to its ordinary limits.

In some embodiments, termination of the under-voltage mode may be dependent upon an alternative exit condition, other than voltage level.

In some embodiments, alternative renewable energy generators or a hybrid power plant may be operated according to the methods described herein.

Many modifications may be made to the above examples without departing from the scope of the present invention as defined in the accompanying claims.

The invention claimed is:

1. A method for controlling a renewable energy generator connected to a Point of Interconnection of an external power grid by a connecting network, the method comprising:
during normal operating conditions before occurrence of a grid fault:
monitoring at least one parameter of the connecting network;
modifying, by a power plant controller of a power plant comprising the renewable energy generator, a predetermined injection profile based on the at least one parameter to generate a current injection profile, wherein the current injection profile indicates output current as a function of measured voltage;
communicating the current injection profile and a reference value to a controller of the renewable energy generator;
storing, by the controller of the renewable energy generator, the current injection profile; and
operating the renewable energy generator according to the reference value provided by the power plant controller rather than the stored current injection profile; and
during the grid fault:
measuring at least one of a voltage across a terminal of the renewable energy generator or a voltage at the connecting network;
calculating, by the controller of the renewable energy generator rather than the power plant controller, an output current based on (i) the at least one of the voltage across the terminal of the renewable energy generator or the voltage of the connecting network and (ii) the stored current injection profile communicated by the power plant controller during normal operating conditions; and
operating, by the controller of the renewable energy generator rather than the power plant controller, the renewable energy generator to produce the output current.

2. The method of claim 1, wherein generating the current injection profile comprises calculating a result of a voltage function.

3. The method of claim 2, wherein the voltage function comprises at least one weight value and receives, as an input, a voltage measured at a point between the renewable energy generator and a low voltage transformer of the connecting network.

4. The method of claim 2, wherein the current injection profile comprises an active current injection profile, and wherein the voltage function is a third-order polynomial.

5. The method of claim 4,
wherein the current injection profile further comprises a reactive current injection profile corresponding to a second voltage function, and wherein the second voltage function is a first-order polynomial.

6. The method of claim 2, wherein the current injection profile comprises a reactive current injection profile, and wherein the voltage function is a first-order polynomial.

7. The method of claim 1, wherein the predetermined injection profile is an earlier iteration of the current injection profile.

8. The method of claim 7, wherein modifying the predetermined injection profile is performed at intervals during normal operating conditions, such that the current injection profile is updated iteratively.

9. The method of claim 1, wherein the at least one parameter is a voltage level measured at a point in the connecting network.

10. The method of claim 9, wherein the point in the connecting network is between a low-voltage transformer and the renewable energy generator.

11. The method of claim 1, wherein the at least one parameter is an impedance of the connecting network.

12. The method of claim 1, further comprising:
updating a stored current injection profile after generating the current injection profile.

13. The method of claim 1, further comprising:
setting a default current injection profile as the predetermined injection profile for a first iteration of modifying the predetermined injection profile.

14. A renewable energy power plant comprising:
a plurality of renewable energy generators;
a power network connecting the plurality of renewable energy generators to a Point of Interconnection (PoI) to an external power grid; and
a power plant controller configured to, during normal operating conditions before occurrence of a grid fault:
monitor at least one parameter of the power network;
modify a predetermined injection profile based on the at least one parameter to generate a current injection profile, wherein the current injection profile indicates output current as a function of measured voltage;
communicate the current injection profile and a reference value to a controller of a renewable energy generator of the plurality of renewable energy generators;
store the current injection profile; and
operate the renewable energy generator according to the reference value provided by the power plant controller rather than the current injection profile; and
wherein during the grid fault:
at least one of a voltage across a terminal of the renewable energy generator or a voltage at the power network is measured;
the controller of the renewable energy generator calculates an output current based on (i) the at least one of the voltage across the terminal of the renewable energy generator or the voltage of the power network and (ii) the stored current injection profile communicated by the power plant controller during normal operating conditions; and
the controller of the renewable energy generator operates the renewable energy generator to produce the output current.

15. A computer program stored on a machine-readable medium and comprising program code instructions which, when executed, perform an operation for controlling a renewable energy generator that is connected to a Point of Interconnection of an external power grid by a connecting network, the operation comprising:
during normal operating conditions before occurrence of a grid fault:
monitoring at least one parameter of the connecting network;
modifying, by a power plant controller of a power plant comprising the renewable energy generator, a predetermined injection profile based on the at least one parameter to generate a current injection profile, wherein the current injection profile indicates output current as a function of measured voltage;
communicating the current injection profile and a reference value to a controller of the renewable energy generator;
storing, by the controller of the renewable energy generator, the current injection profile; and
operating the renewable energy generator according to the reference value provided by the power plant controller rather than the current injection profile; and
during the grid fault:
measuring at least one of a voltage across a terminal of the renewable energy generator or a voltage at the connecting network;
calculating, by the controller of the renewable energy generator rather than the power plant controller, an output current based on (i) the at least one of the voltage across the terminal of the renewable energy generator or the voltage of the connecting network and (ii) the stored current injection profile communicated by the power plant controller during normal operating conditions; and
operating, by the controller of the renewable energy generator rather than the power plant controller, the renewable energy generator to produce the output current.

16. The computer program of claim 15, wherein generating the current injection profile comprises calculating a result of a voltage function.

17. The computer program of claim 16, wherein the voltage function comprises at least one weight value and receives, as an input, a voltage measured at a point between the renewable energy generator and a low voltage transformer of the connecting network.

18. The computer program of claim 16, wherein the current injection profile is an active current injection profile, and wherein the voltage function is a third-order polynomial.

* * * * *